P. W. AMLIE.
ANIMAL POKE.
APPLICATION FILED JUNE 25, 1908.

940,573.

Patented Nov. 16, 1909.

Witnesses
Thos. E. Barnes
T. S. Beall

Inventor
Paul W. Amlie
By William O. Deane
his Attorney

UNITED STATES PATENT OFFICE.

PAUL W. AMLIE, OF BINFORD, NORTH DAKOTA.

ANIMAL-POKE.

940,573. Specification of Letters Patent. Patented Nov. 16, 1909.

Application filed June 25, 1908. Serial No. 440,365.

*To all whom it may concern:*

Be it known that I, PAUL W. AMLIE, citizen of the United States, residing at Binford, in the county of Griggs and State of North Dakota, have invented certain new and useful Improvements in Animal-Pokes, of which the following is a specification.

My invention pertains to animal pokes—i. e., devices designed to be placed upon the necks of cattle with a view of causing the same to desist in the event of their trying to work through a wire or other fence; and it consists in the peculiar and advantageous poke hereinafter described and particularly pointed out in the claims appended.

Figure 1:
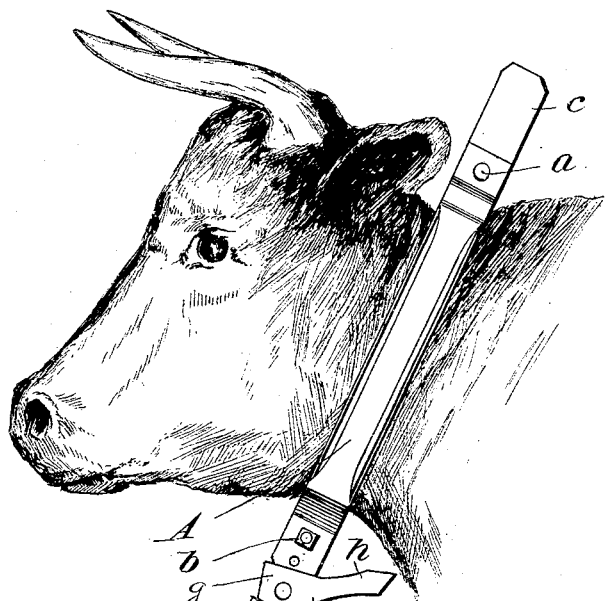
Figure 2:
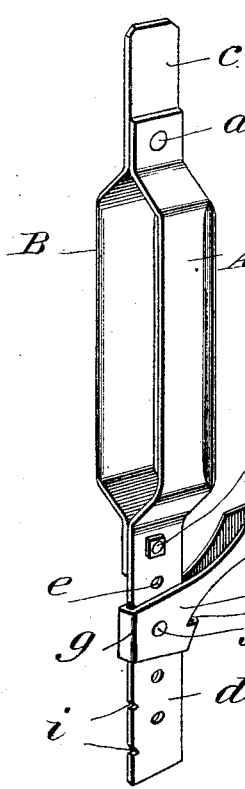
Figure 3:
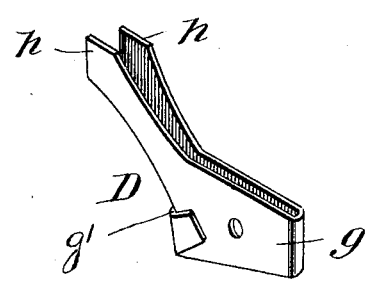

In the drawings accompanying and forming part of this specification: Figure 1 is a view showing my novel poke properly arranged on the neck of a cow. Fig. 2 is a perspective view of the poke removed and showing a slightly modified form of prodding device. Fig. 3 is a detail view, on an enlarged scale, illustrative of the device comprised in my improved poke as shown in Fig. 2 for prodding the neck of an animal when the same attempts to work its way through a fence.

Similar letters designate corresponding parts in all of the views of the drawings, referring to which:

A is the neck-receiving, major portion of my novel poke. This portion is formed by two members A and B bolted or otherwise detachably connected together at $a$ and $b$; and it will be observed by reference to Fig. 2 that the member B terminates in an upwardly extending bar $c$ designed to bring up against and be pressed rearward by a fence runner or the like, and the member C terminates in a depending bar $d$ for a similar purpose. This specific construction is materially advantageous since it permits of two comparatively short pieces of material being employed in the construction of the poke and in that way contributes to the inexpensiveness of the same.

As shown in Figs. 1 and 2, the depending bar $d$ of the member C is provided at intervals of its length with transverse apertures $e$. These are for the passage of the bolt $f$ connecting the prodding device D, and are provided in order that said device may be positioned at various points on the depending bar $d$ to suit animals of various sizes.

The prodding device D is formed of a single piece of thin and resilient sheet-metal and is made up of a loop $g$ which receives the bar $d$ and has apertures for the passage of the bolt $f$, and rearwardly diverging and resilient prods $h$. By virtue of the said prods $h$ diverging and being possessed of resiliency or springiness as stated, it will be observed that when the bar $d$ is pressed rearward, they will not engage the tender apex portion of a cow's neck, but on the other hand will straddle said apex portion and prick the neck in rear thereof, and this in such manner that no serious injury will be inflicted but merely enough pain to cause the animal to desist from its efforts to work through a wire fence or the like. This latter is due to the resiliency or springiness of the prods $h$ which enables the same to bow when their points engage the flesh and precludes said points penetrating the flesh to an undue extent.

As will be observed by reference to Fig. 3, one end of the loop $g$ is closed by portion $g^1$ which extends from one side wall of the loop and is lapped over the other side wall and consequently serves to limit downward movement of the loop and prevent undue spreading apart of the resilient prods. The end of the loop $g$ remote from the portion $g^1$ may be shaped in the manner shown in Fig. 1, or in the manner shown in Figs. 2 and 3 without affecting my invention.

As will be observed by reference to the drawings, the bar $d$ is provided in its forward edge at intervals of its length with notches $i$. These notches are designed to seat the loop $g$ of the prodding device D in the manner shown with a view of permitting said device to incline slightly upwardly and rearwardly so as to better engage a cow's neck or breast. As will be readily noted the said notches $i$ while advantageous as stated do not add appreciably to the cost of producing the poke.

Notwithstanding the practical advantages which I have hereinbefore ascribed to my novel poke, it will be observed that the same is simple and inexpensive, and is well adapted to withstand the rough usage to which such devices are ordinarily subjected.

Having described my invention, what I claim and desire to secure by Letters Patent, is:—

1. An animal poke having a neck-receiving, major portion; the said portion being formed of two members detachably connected together above and below the same, one of the members terminating in an upwardly extending bar and the other member terminating in a depending bar, and a prodding device comprising resilient prods extending rearwardly and upwardly and formed of a single piece of thin and resilient sheet metal bent upon itself to form a loop to receive the depending bar and having an overlapping portion at its rear for preventing undue spreading apart of the prods as well as limiting the downward movement of the loop; said loop-portion having adjustable securing means in connection with the depending bar.

2. In an animal poke, the combination with a neck-receiving portion and a bar extending therefrom and having a notch in its forward edge; of a prodding device fixed on said bar and comprising a loop receiving the bar and having its lower edge seated in the notch thereof, and resilient or springy prods extending rearward and outward from the ends of the sides of the loop.

In testimony whereof I affix my signature in presence of two witnesses.

PAUL W. AMLIE.

Witnesses:
   E. C. AMADON,
   THEO. SMOGARD.